US012240241B2

(12) United States Patent
Cyman et al.

(10) Patent No.: US 12,240,241 B2
(45) Date of Patent: Mar. 4, 2025

(54) SYSTEM AND METHOD FOR PRINTING ON A CLEAR POLYMERIC FILM WEB

(71) Applicant: Cryovac, LLC, Charlotte, NC (US)

(72) Inventors: Theodore F. Cyman, Grand Island, NY (US); Kevin John Hook, Grand Island, NY (US); Alan Ronald Murzynowski, Grand Island, NY (US); Paul Coniglio, East Amherst, NY (US); Frank J. Rocco, N. Tonawanda, NY (US)

(73) Assignee: Cryovac, LLC, Charlotte, NC (US)

( * ) Notice: Subject to any disclaimer, the term of this patent is extended or adjusted under 35 U.S.C. 154(b) by 136 days.

(21) Appl. No.: 17/910,427

(22) PCT Filed: Mar. 11, 2021

(86) PCT No.: PCT/US2021/021842
§ 371 (c)(1),
(2) Date: Sep. 9, 2022

(87) PCT Pub. No.: WO2021/183731
PCT Pub. Date: Sep. 16, 2021

(65) Prior Publication Data

US 2023/0026904 A1 Jan. 26, 2023

Related U.S. Application Data

(60) Provisional application No. 62/988,467, filed on Mar. 12, 2020.

(51) Int. Cl.
*B41J 2/155* (2006.01)
*B41J 2/21* (2006.01)
(Continued)

(52) U.S. Cl.
CPC ................ *B41J 2/155* (2013.01); *B41J 2/21* (2013.01); *B41J 2/515* (2013.01); *B41J 11/002* (2013.01);
(Continued)

(58) Field of Classification Search
CPC ..... B41J 11/00214; B41J 11/00; B41J 2/2117; B41J 2/2146; B41J 2/2054; B41J 2/21;
(Continued)

(56) References Cited

U.S. PATENT DOCUMENTS 5,734,390 A 3/1998 Sakaizawa et al.
5,764,254 A 6/1998 Nicoloff et al.
(Continued)

FOREIGN PATENT DOCUMENTS

CN 103534099 A 1/2014
CN 105525531 A 4/2016
(Continued)

*Primary Examiner* — John Zimmermann
(74) *Attorney, Agent, or Firm* — Jason R. Womer

(57) ABSTRACT

A system (20) and method for printing on clear polymeric film web (24) are disclosed. A first stationary inkjet print unit (44, 60, 70, 82) has first ejection nozzles that span a width of the clear polymeric film web and a second stationary inkjet print unit (44, 60, 70, 82) has second ejection nozzles that span the width of the clear polymeric film web. A web transport conveys the clear polymeric film web past the stationary inkjet print units. First and second print controllers operate the first and second and stationary inkjet print units to deposit drops of a first and a second material on the clear polymeric film web at a first and a second resolution, respectively. In addition, dimensions and position of a page element to be printed on the clear polymeric film web are adjusted to compensate for distortion that may occur to the printed page element due to shrinking of the clear polymeric film web.

18 Claims, 10 Drawing Sheets

(51) Int. Cl.

| | |
|---|---|
| ***B41J 2/515*** | (2006.01) |
| ***B41J 11/00*** | (2006.01) |
| ***B41J 15/04*** | (2006.01) |
| ***B41M 3/00*** | (2006.01) |
| ***B41M 5/00*** | (2006.01) |
| *B41J 25/00* | (2006.01) |

(52) U.S. Cl.

CPC .............. *B41J 15/04* (2013.01); *B41M 3/008* (2013.01); *B41M 5/0047* (2013.01); *B41J 2025/008* (2013.01); *B41J 2202/21* (2013.01)

(58) Field of Classification Search

CPC ..... B41J 2/01; B41J 2/155; B41J 3/54; C09D 11/101; C09D 11/30; G06K 15/02; G03G 15/22; H04N 1/60

See application file for complete search history.

(56) References Cited

U.S. PATENT DOCUMENTS

| | | | |
|---|---|---|---|
| 5,883,644 | A | 3/1999 | Nicoloff et al. |
| 6,033,048 | A | 3/2000 | Nicoloff et al. |
| 9,376,582 | B1 | 6/2016 | Dannhauser et al. |
| 9,387,670 | B1 | 7/2016 | Kelly et al. |
| 9,434,201 | B2 | 9/2016 | Dannhauser et al. |
| 10,336,094 | B2 | 7/2019 | Ogura |
| 10,350,904 | B2 | 7/2019 | Hasegawa |
| 10,414,168 | B2 | 9/2019 | Yoshida |
| 2002/0036803 | A1* | 3/2002 | La Torre .............. H04N 1/4051 358/1.1 |
| 2004/0189772 | A1* | 9/2004 | Arai ................... B41J 11/00212 347/102 |
| 2005/0046680 | A1 | 3/2005 | Cheng et al. |
| 2005/0093956 | A1 | 5/2005 | Egan |
| 2005/0200679 | A1* | 9/2005 | Falser ..................... B41J 2/1433 347/104 |
| 2006/0072939 | A1* | 4/2006 | Kremer .............. G03G 15/5095 345/660 |
| 2008/0049055 | A1 | 2/2008 | Edamura et al. |
| 2008/0136854 | A1 | 6/2008 | Yamaguchi et al. |
| 2012/0120168 | A1* | 5/2012 | Kachi ................ B41J 11/00218 347/102 |
| 2014/0085368 | A1 | 3/2014 | Mo |
| 2014/0185064 | A1 | 7/2014 | Muraji et al. |
| 2016/0031246 | A1 | 2/2016 | Sreekumar et al. |
| 2016/0155030 | A1 | 6/2016 | Blank et al. |
| 2016/0243820 | A1* | 8/2016 | Yanaka ..................... B41J 3/407 |
| 2016/0279978 | A1 | 9/2016 | Stephens et al. |
| 2016/0355006 | A1 | 12/2016 | Reder |
| 2017/0021641 | A1* | 1/2017 | Goi ...................... C09D 11/107 |
| 2017/0225460 | A1 | 8/2017 | Strasemeier et al. |
| 2018/0309888 | A1* | 10/2018 | Collins ................ H04N 1/6097 |
| 2019/0118549 | A1 | 4/2019 | Yasuda et al. |
| 2021/0053362 | A1* | 2/2021 | Shigeta .................. B41J 2/2132 |

FOREIGN PATENT DOCUMENTS

| | | | |
|---|---|---|---|
| DE | 102015205105 | A1 | 9/2016 |
| EP | 2933194 | A1 | 10/2015 |
| JP | 2001158135 | A | 6/2001 |
| WO | 2019115608 | A1 | 6/2019 |
| WO | 2019131204 | A1 | 7/2019 |
| WO | 2019159859 | A1 | 8/2019 |

* cited by examiner

SYSTEM AND METHOD FOR PRINTING ON A CLEAR POLYMERIC FILM WEB

CROSS-REFERENCE TO RELATED APPLICATIONS

This application claims priority to U.S. Provisional Patent Application Ser. No. 62/988,467, filed Mar. 12, 2020 and entitled "System and Method for Printing On A Clear Polymeric Film Web," the entirety of which is incorporated herein by reference.

BACKGROUND

The present subject matter relates to web printing systems and methods, and more particularly, to a system and method for printing on clear polymeric film web.

High speed printing systems have been developed for printing on a substrate, such as a web of shrinkable polymeric film. Such a material typically exhibits both elasticity and plasticity characteristics that depend upon one or more applied influences, such as force, heat, chemicals, electromagnetic radiation, etc. These characteristics must be carefully taken into account during the system design process because it may be necessary: 1.) to control material shrinkage during imaging so that the resulting imaged film may be subsequently used in a shrink-wrap process, and 2.) to avoid system control problems by minimizing dynamic interactions between system components due to the elastic deformability of the substrate.

Also, a flexible web is subject to the formation of wrinkles therein, resulting in poor or even unacceptable print quality. A further issue is encountered in a print system using ink jet printheads to apply inks to a flexible web. A splice or wrinkle passing an ink jet printer during high speed production can damage one or more of the printheads of the printer, resulting in expensive downtime and the need to replace the damaged printheads, entailing significant replacement costs.

The discussion above is merely provided for general background information and is not intended to be used as an aid in determining the scope of the claimed subject matter.

BRIEF DESCRIPTION

According to one aspect, a system for printing on clear polymeric film web, includes a first stationary inkjet print unit having first ejection nozzles that span a width of the clear polymeric film web and a second stationary inkjet print unit having second ejection nozzles that span the width of the clear polymeric film web. The system also includes a web transport that conveys the clear polymeric film web past the first and second stationary inkjet print units, a first print controller that operates the first stationary inkjet print unit to deposit drops of a first material on the clear polymeric film web at a first resolution, and a second print controller that operates the second stationary inkjet print unit to deposit drops of a second material on the clear polymeric film web at a second resolution. The first and second resolutions are different.

According to another aspect, a method for printing on clear polymeric film web includes conveying the clear polymeric film web past first and second stationary inkjet print units. The method also includes operating the first stationary inkjet print unit to deposit drops of a first material on the clear polymeric film web at a first resolution and operating the second stationary inkjet print unit to deposit drops of a second material on the clear polymeric film web at a second resolution, the first and second resolutions are different.

Other aspects and advantages will become apparent upon consideration of the following detailed description and the attached drawings wherein like numerals designate like structures throughout the specification.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Figure 1:
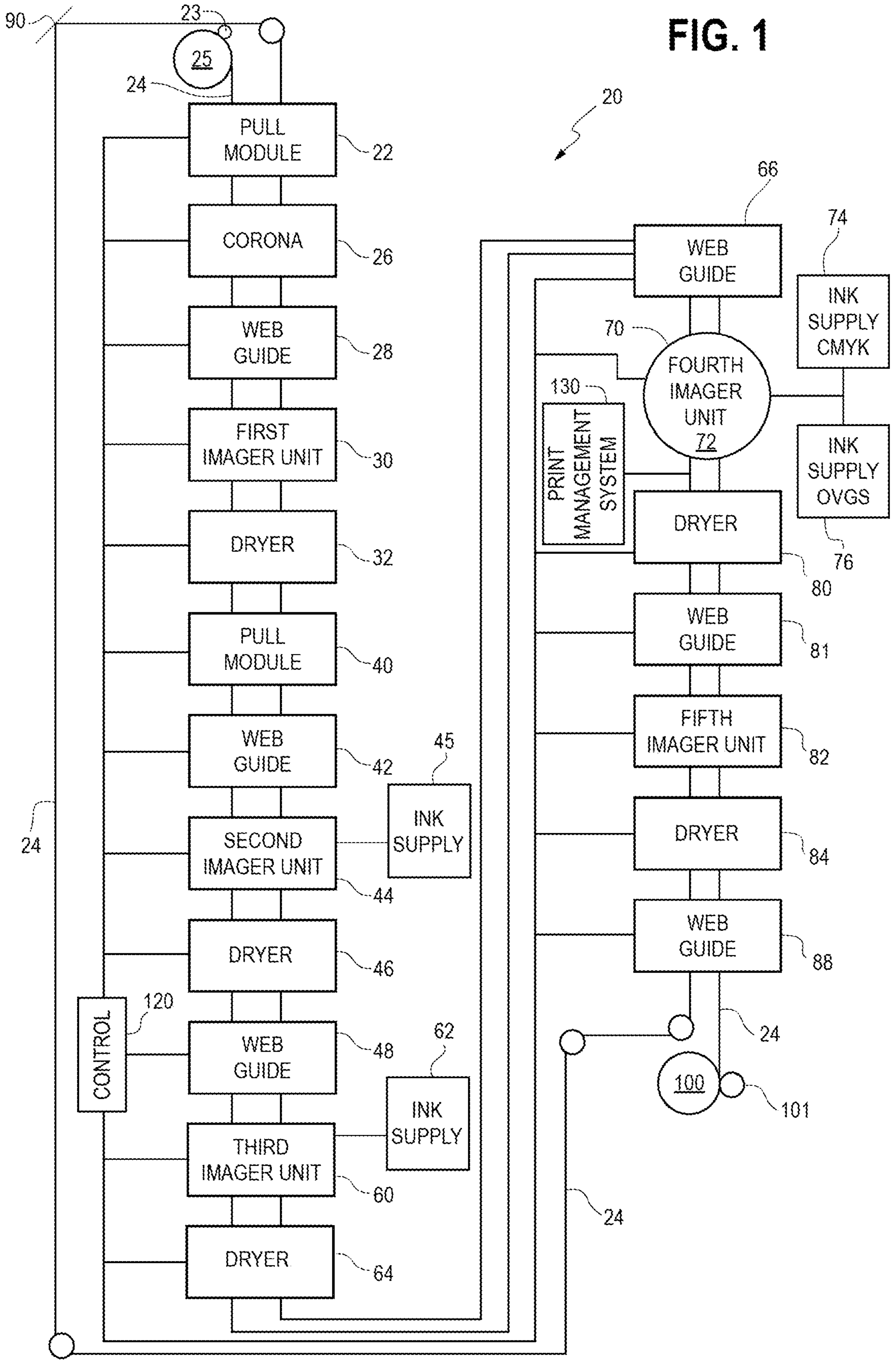
FIG. 1 is a simplified block diagram of an exemplary system for printing images and/or text on a substrate.

FIG. 1 shows an exemplary system 20 for printing content (e.g., images and/or text) on a substrate, such as a shrinkable plastic film used in food grade applications. It should be understood, however, that the system 20 may be used to print on any polymer or other flexible material that is dimensionally stable or unstable during processing for any application, e.g., other than food grade. The system 20 preferably operates at high-speed, e.g., on the order of zero to about 500 or more feet per minute (fpm) and even up to about 1000 fpm, although the system may be operable at a different speed, as necessary or desirable. The illustrated system 20 is capable of printing images and/or text on both sides of a substrate (i.e., the system 20 is capable of duplex printing) although this need not be the case. In the illustrated embodiment, a first side of a substrate is imaged by a sequence of particular units during a first pass, the substrate is then turned over and the other side of the substrate is imaged by all of the particular units or only by a subset of the particular units during a second pass. First portions of one or more of the particular units may be operable during the first pass and second portions of one or more of the particular units laterally offset from the first portions may be operable during the second pass. Also, one or more of the particular units may be capable of simultaneously treating and/or imaging both sides of the substrate during one pass, in which case such unit(s) need not be operable during the other pass of the substrate. In the illustrated embodiment, the first portions are equal in lateral extent to the second portions, although this is not necessarily the case. Thus, for example, the system may have a 52 inch width, and may be capable of duplex printing up to a 26 inch wide substrate. Alternatively, a 52 inch wide (or smaller) substrate may be printed on a single side (i.e., simplex printed) during a single production run. If desired, additional imager units and associated dryer and web guide units may be added in line with the disclosed imager units and other units so as to obtain full-width (i.e., 52 inch in the disclosed embodiment) duplex printing capability. Still further, a substrate having a different width, such as 64 inches (or larger or smaller width) may be accommodated.

Further, the illustrated system 20 may comprise a fully digital system that solely utilizes ink jet printers, although other printing methodologies may be utilized to image one or more layers, such as flexographic printing, lithographic offset printing, silk screen printing, intaglio printing, letterpress printing, etc. Ink jet technology offers drop on demand capability, and thus, among other advantages, allows high levels of color control and image customization.

In addition to the foregoing, certain ink jet heads are suitable to apply the high opacity base ink(s) that may be necessary so that other inks printed thereon can receive enough reflected white light (for example) so that the overprinted inks can adequately perform their filtering function. Some printhead technologies are more suitable for flood coating printing, like printing overcoat varnish, primers, and white, and metallic inks.

On the other hand, printing high fidelity images with high resolution printheads achieves the best quality. Using drum technology and printing with ink jet is the preferred way to maintain registration, control a flexible/shrinkable film substrate, and reproduce an extended gamut color pallet.

The system disclosed herein has the capability to print an extended gamut image. In some cases the color reproduction required may need a custom spot color to match the color exactly. In these cases, an extra eighth channel (and additional channels, if required) can be used to print custom color(s) in synchronization with the other processes in the system.

Printing on flexible/shrinkable films with water-based inks has many challenges and require fluid management, temperature control, and closed loop processes. Thus, in the present system, for example, the ability to maintain a high quality color gamut at high speed is further process controlled by sensor(s) that may comprise one or more calibration cameras to fine tune the system continually over the length of large runs.

As used herein, the phrase “heat-shrinkable” is used with reference to films which exhibit a total free shrink (i.e., the sum of the free shrink in both the machine and transverse directions) of at least 10% at 185° F., as measured by ASTM D2732, which is hereby incorporated, in its entirety, by reference thereto. All films exhibiting a total free shrink of less than 10% at 18° F. are herein designated as being non-heat-shrinkable. The heat-shrinkable film can have a total free shrink at 185° F. of at least 15%, or at least 20%, or at least 30%, or at least 40%, or at least 45%, or at least 50%, or at least 55%, or at least 60%, or at least 65%, or at least 70%, as measured by ASTM D2732. Heat shrinkability can be achieved by carrying out orientation in the solid state (i.e., at a temperature below the glass transition temperature of the polymer). The total orientation factor employed (i.e., stretching in the transverse direction and drawing in the machine direction) can be any desired factor, such as at least 2×, at least 3×, at least 4×, at least 5×, at least 6×, at least 7×, at least 8×, at least 9×, at least 10×, at least 16×, or from 1.5× to 20×, from 2× to 16×, from 3× to 12×, or from 4× to 9×.

Figure 2:
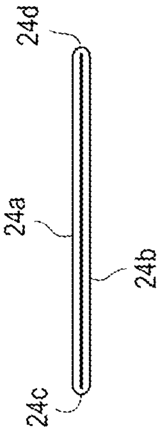
FIG. 2 is an end elevational view of a polymeric film to be imaged by the system of FIG. 1.

As shown in FIG. 1, the illustrated system 20 includes a first pull module 22 that unwinds a web of plastic web 24 from a roll 25 that is engaged by a nip roller 23 at the beginning of a first printing pass through the system 20. The web 24 may comprise a flattened cylinder or tube of plastic film comprising two layers having sides **24*a*, 24*b* (see FIG. 2) joined at side folds 24*c*, 24*d*, although the web 24 may instead simply comprise a single layer of material, if desired and as referred to above. Once unwound by the module 22, the web 24 may be processed by a surface energy modification system, such as a corona treatment unit 26 of conventional type, that increases the surface energy of the web 24. The corona treatment addresses an imaging condition that may be encountered when a large number of closely spaced drops are applied to a low surface energy impermeable material, which, if not compensated for, can result in positional distortion of the applied inks due to coalescence effects. The corona treatment module may be capable of treating both sides of the web 24 simultaneously. A first web guide 28 of conventional type that controls the lateral position of the web 24 in a closed-loop manner then guides the corona-treated web 24 a first imager unit 30. A first dryer unit 32 is operated to dry the material that is applied to the web 24 by the first imager unit 30. The material applied by the first imager unit 30 may be deposited over the entirety of the web 24** or may be selectively applied only to some or all areas that will later receive ink.

A second pull module 40 and a second web guide 42 (wherein the latter may be identical to the first web guide 28) deliver the web 24 to a second imager unit 44 that prints a material supplied by a first supply unit 45 on the web 24. A second dryer unit 46 is operable to dry the material applied by the second imager unit 44.

Thereafter, the web 24 is guided by a third web guide 48 (again, which may be identical to the first web guide 28) to a third imager unit 60 that applies material supplied by a second supply unit 62 thereon, such as at a location at least partially covering the material that was deposited by the second imager unit 44. A third dryer unit 64 is operable to dry the material applied by the third imager unit 60 and the web 24 is then guided by a fourth web guide 66 (that also may be identical to the first web guide 28) to a fourth imager unit 70 comprising a relatively high resolution, extended color gamut imager unit 70.

The imager unit 70 includes a drum 72 around which are arranged ink jet printheads for applying primary process color inks CMYK to the web 24 along with secondary process color inks orange, violet, and green OVG and an optional spot color ink S to the web 24 at a relatively high resolution, such as 1200 dpi and at a high speed (e.g., 100-500 fpm). The extended gamut printing is calibrated at the high printing speed. The drop sizes thus applied are relatively small (on the order of 3-6 pL). If desired, the imager unit 70 may operate at a different resolution and/or apply different drop sizes. The inks are supplied by third and fourth supply units 74, 76, respectively, and, in some embodiments, the inks are of the water-based type. The process colors comprising the CMYK and OVG inks enable reproduction of extended gamut detailed images and high quality graphics on the web 24. A fourth dryer unit 80 is disposed downstream of the fourth imager unit 70 and dries the inks applied thereby.

Following imaging, the web 24 may be guided by a web guide 81 (preferably identical to the first web guide 28) and coated by a fifth imager unit 82 comprising an ink jet printer operating at a relatively low resolution and large drop size (e.g., 600 dpi, 5-12 pL size drops) to apply an overcoat, such as varnish, to the imaged portions of the web 24. The overcoat is dried by a fifth dryer unit 84. Thereafter, the web is guided by a web guide 88 (also preferably identical to the first web guide 28), turned over by a web turn bar 90, which may comprise a known air bar, and returned to the first pull module 22 to initiate a second pass through the system 20, following which material deposition/imaging on the second side of the web 24 may be undertaken, for example, as described above. The fully imaged web 24 is then stored on a take-up roll 100 engaged by a nip roll 101 and thereafter may be further processed, for example, to create shrink-wrap bags.

While the web 24 is shown in FIG. 1 as being returned to first the pull module 22 at the initiation of the second pass, it may be noted that the web may be instead delivered to another point in the system 20, such as the web guide 28, the first imager unit 30, the pull module 40, the web guide 42, or the imager unit 44 (e.g., when the web 24 is not to be pre-coated), bypassing front end units and/or modules, such as the module 22 and the corona treatment unit 26.

Further, in the case that the web 24 is to be simplex printed (i.e., on only one side) the printed web 24 may be stored on the take-up roll 100 immediately following the first pass through the system 20, thereby omitting the second pass entirely.

The web 24 may be multilayer and may have a thickness of 0.25 mm or less, or a thickness of from 0.5 to 30 mils, or from 0.5 to 15 mils, or from 1 to 10 mils, or from 1 to 8 mils, or from 1.1 to 7 mils, or from 1.2 to 6 mils, or from 1.3 to 5 mils, or from 1.5 to 4 mils, or from 1.6 to 3.5 mils, or from 1.8 to 3.3 mils, or from 2 to 3 mils, or from 1.5 to 4 mils, or from 0.5 to 1.5 mils, or from 1 to 1.5 mils, or from 0.7 to 1.3 mils, or from 0.8 to 1.2 mils, or from 0.9 to 1.1 mils. The web 24 may have a film percent transparency (also referred to herein as film clarity) measured in accordance with ASTM D 1746-97"Standard Test Method for Transparency of Plastic Sheeting", published April, 1998, which is hereby incorporated, in its entirety, of at least 15 percent, or at least 20 percent, or at least 25 percent, or at least 30 percent.

Preferably, the system 20 includes a first tension zone between the roll 25 (which is a driven roll) and the pull module 22, a second tension zone between the pull module 22 and the imager unit 30, a third tension unit between the imager unit 30 and the pull module 40, a fourth tension zone between the pull module 40 and the imager unit 44, a fifth tension zone between the imager unit 44 and the imager unit 60, a sixth tension zone between the imager unit 60 and the drum 72, a seventh tension zone between the drum 72 and the imager unit 82, and an eighth tension zone between the imager unit 82 and the take-up roll 100 (which is a driven roll). One or more tension zones may be disposed between the imager unit 82 and the pull module 22 and/or at other points in the system 20. Each of the elements defining the ends of the tension zones comprises, for example, a driven roll (which, in the case of the imager units 30, 44 60, 70, and 82, comprise imager drums) with a nip roller as described in greater detail hereinafter. Preferably, all of the tension zones are limited to about 20 feet or less in length. The web tension in each tension zone is controlled by one or more tension controllers such that the web tension does not fall outside of predetermined range(s).

The nature and design of the first, second, and third imager units 30, may vary with the printing methodologies that are to be used in the system 20. For example, in a particular embodiment in which a combination of flexographic and ink jet reproduction is used, then the first imager unit 30 may apply a composition comprising a clear primer and a dispersion of a white colorant, such as titanium dioxide, in a flood-coated fashion to the web 24. The second imager unit 44, which may comprise an ink jet printer or a flexographic unit, may thereafter deposit one or more metallic ink(s) onto the web at least in portions that received material from the first imager unit 30. In such an embodiment, the third imager unit 60 is not required, and the imager unit 60 and dryer unit 64 and web guide 66 associated therewith may be omitted.

In a further embodiment, the first imager unit 30 comprises a flexographic unit that applies a white pigmented ink to the web 24, the second imager unit 44 comprises an ink jet printer or a flexographic unit that applies one or more metallic inks, and the third imager unit 60 comprises an ink jet printer or flexographic unit that applies a clear primer to the web 24.

In yet another embodiment that uses ink jet technology throughout the system 20, the first imager unit 30 comprising an ink jet printer may apply a composition comprising a clear primer and a dispersion of a white colorant, such as titanium dioxide, to the web 24. The second imager unit 44, which comprises an ink jet printer, may thereafter deposit one or more metallic ink(s) onto the web at least in portions that received material from the first imager unit 30. In such an embodiment, the third imager unit 60 is not required, and the imager unit 60 and dryer unit 64 and web guide 66 associated therewith may be omitted.

In a still further embodiment, the first imager unit 30 comprises an ink jet printer that applies a white pigmented ink to the web 24, the second imager unit 44 comprises an ink jet printer that applies one or more metallic inks, and the third imager unit 60 comprises an ink jet printer that applies a clear primer to the web 24.

Any one or more of the imager units 30, 44, 60, 70, and 82 may be omitted or the functionality thereof may be combined with one or more other imager units. Thus, for example, in the case where a combined primer and white pigmented material are applied, the combination may be printed by one of the imager units 30 or 44 and the other of the imager units 30, 44 may be omitted.

In some embodiments each of the first, second, and third imager units 30, 44, 60 comprises a 600 dpi (dots per inch) inkjet printer that applies relatively large drops (i.e., at least 5-12 picoliters (pL)) each using piezoelectric ink jet heads, although the imager units 30, 44, and/or 60 may operate at a different resolution and/or apply different sizes of drops. Thus, for example, a printhead designed for use with metallic and precoating inks in the present system may have a resolution of 400 dpi and drop volume of 20-30 pL. The pre-coating material, white, and metallic inks have relatively heavy pigment loading and/or large particle sizes that are best applied by the relatively low resolution/large drop size heads of the imager units 30, 44, 60.

In alternative embodiments, one or more of the primer, white, and coating imager units may operate at a relatively high resolution and/or small drop size, such as 1200 dpi/3-6 pL.

The primer renders at least a portion of the surface of the web 24 suitable to receive later-applied water-based inks. It is preferable (although not necessary) to apply the primer just before the process and spot color inks are applied by the fourth imager unit 70 so that the such colors are directly applied to the dried primer.

Preferably, the fourth imager unit 70 comprises the above-described ink jet printer so that drop-on-demand technology may be taken advantage of, particularly with respect to print-to-print variability, high resolution, and the ability to control registration precisely.

The fifth imager unit 82 also preferably comprises an ink jet printer that operates at least at 1200 dpi or 2400 dpi, although it may instead be implemented by a different printing methodology, such as a flexographic unit.

As noted in greater detail hereinafter, a supervisory or global control system 120 is responsive to sensors (not shown in FIG. 1) and is responsible for overall closed-loop control of various system devices during a production run. A further control system comprising a print management control system 130 controls the various imager units also in a closed-loop fashion to control image reproduction as well as color correction, registration, correct for missing pixels, etc.

Also in the illustrated embodiment, each dryer unit 32, 46, 64, 80, and 84 is controlled by an associated closed-loop dryer management system (not shown in FIG. 1) during printing to, among other things, minimize image offsetting (sometimes referred to as "pick-off"), which can result in artifacts that may result from improper or insufficient drying of ink deposited on the web causing undried ink/coating to adhere (i.e., offset) to one or more system handling components, such as idler roller(s) or other component(s), and be transferred from such system handling component(s) to other portions of the web.

In the case of a partially or completely ink jet implemented system, the printheads used by the first through fifth imager units 30, 44, 60, 70, and/or 82 may be of the same or different types, even within each printer, and/or, as noted previously, different printing methodologies could be used to apply inks/coatings. In any event, the global control system 120 and/or the print management control system 130 is (are) programmed to convert input data representing the various layers, such as data in a print-ready source format (e.g., Adobe Portable Document Format or PDF) to bitmaps by a ripping process or other page representation(s) during pre-processing taking into account the operational characteristics of the various printhead types/printing methodologies (such as the resolution(s) and drop size(s) to be deposited) and properties of the web (such as shrinkage when exposed to heat).

In addition to the foregoing, one or more additional control systems may be provided, for example, to track and control the web 24 as the web 24 is conveyed through the system 20 and as described further hereinafter. The various control systems may be implemented together or separately by one or more suitable programmable devices, input sensors, and output control devices, as appropriate or desirable.

Figure 3:
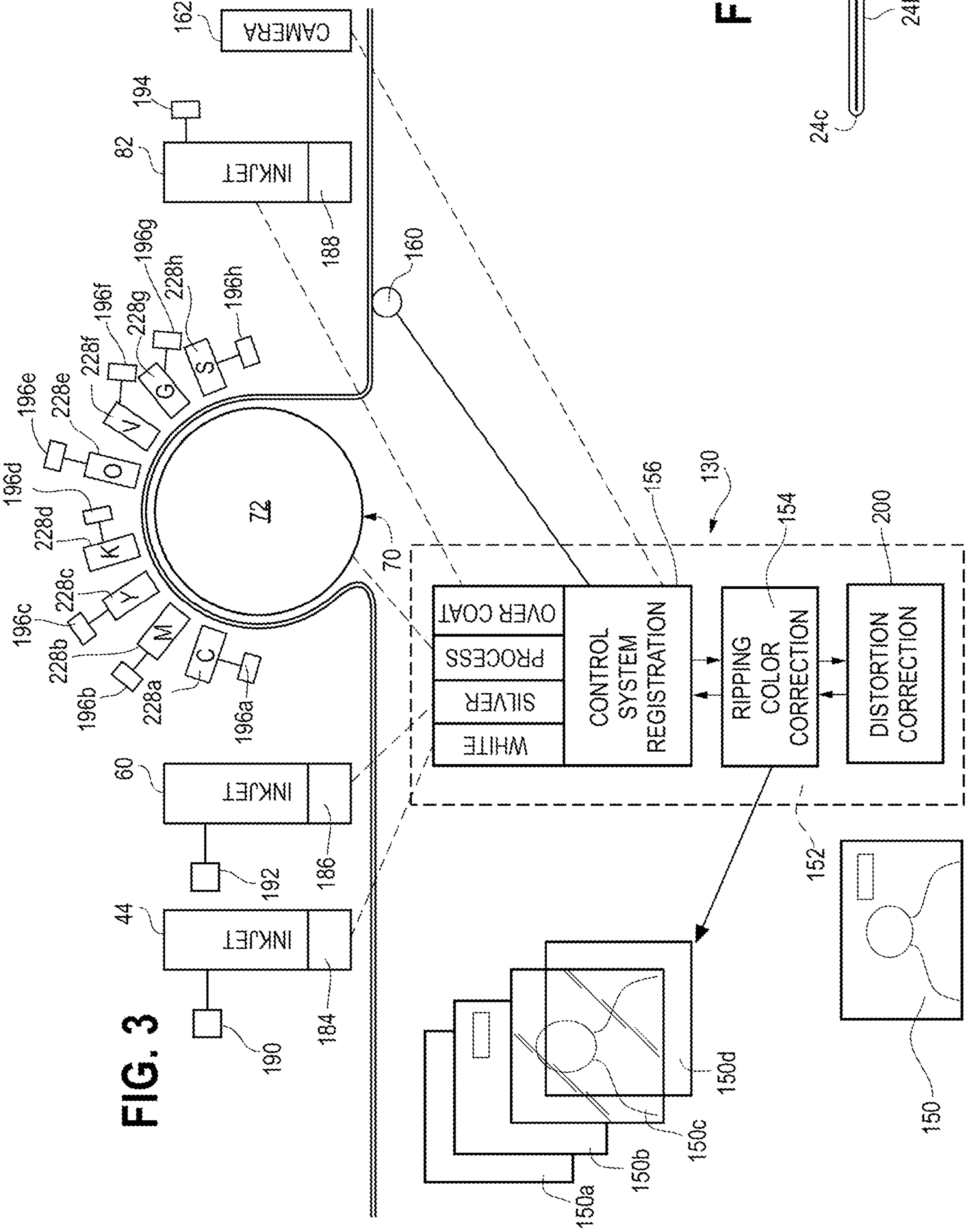
FIG. 3 is a simplified functional block diagram of the print management system of FIG. 1.

Referring next to FIG. 3, an exemplary embodiment of the print management control system 130 is illustrated in generalized form, it being assumed that the first imager unit 30 applies pre-coating material over a selected portion of or over the entire web 24 so that control of such imager unit 30 is straightforward and therefore not illustrated. The exemplary print management control system 130 takes in pages 150 in a print-ready format, such as PDF or another print-ready or non-print-ready format, and divides each page into data representing layers that are to be imaged by the imager units 44, 60, 70, and 82. More particularly, using the illustrated page 150 as an example, a processing unit 152 divides the data defining the page 150 into layer data representing four layers 150*a*, 150*b*, 150*c*, and 150*d* to be printed in white, silver, process colors (with an optional spot color), and overcoat, respectively, color corrects the layer data as needed taking into account the particular inks and web material, and converts the color corrected layer data into four layer bitmaps using a raster image processing (RIP) technique (block 154). The processing unit 152 then determines registration parameters that are used in conjunction with the layer bitmaps to control the individual imager units 44, 60, 70, and 82 (block 156) such that the layer images are accurately printed atop one another on the web 24.

The processing unit 152, which may comprise a suitably programmed computer or server or other programmable device, is responsive to feedback signals developed by sensors including a position encoder 160 and, optionally, a camera 162 that sense web position and the printed image so that the processing unit 152 and/or other controls can operate in a closed-loop manner during start up, shutdown and steady state operation.

The pull module 22, the web guides 42, 48, 66, and 81, and the rollers described above provide a web transport that conveys the web 24 past the imager units 44, 60, 70, and 82. In some embodiments, each of imager units 44, 60, and 82 comprises a inkjet print unit 184, 186, and 188, respectively, and a print unit controller 190, 192, and 194, respectively. Each inkjet print unit 184, 186, and 188 is adapted to selectively deposit a particular material substantially along the width of the web 24. In particular, each inkjet print unit 184, 186, and 188 includes a sufficient number inkjet printheads so that the ejection nozzles of such inkjet printheads substantially span a width of the web 24. In some embodiments, if the inkjet print unit 184, 186, or 188 includes a plurality of inkjet printheads (rather than just one web-wide inkjet printhead), such plurality of inkjet printheads are disposed abutting one another end-to-end in linear fashion to span the web 24. In other embodiments, such plurality of inkjet printheads may be disposed in a carrier (not shown) in a two-dimensional array of inkjet printheads so that the ejection nozzles of the inkjet printheads (and of the inkjet print unit 184, 186, or 188 comprising such inkjet printheads) span the width of the web 24.

Further, the imager unit 70 includes a plurality of inkjet printing units 228*a*-228*h* disposed around a circumference of the drum 72. Each inkjet printing unit 228*a*-228*h* includes a sufficient number of inkjet printheads such that the ejection nozzles of the inkjet printheads substantially span the width of the web 24. The inkjet printhead(s) that comprise(s) each inkjet printing unit 228*a*-228*h* is/are adapted deposit a particular material along substantially along the width of the web 24. For example, the inkjet printhead(s) that comprise(s) the inkjet print unit 228*a* are disposed so that such inkjet printhead(s) may deposit a cyan ink substantially along the width of the web 24. Similarly, the inkjet printhead(s) that comprise(s) the inkjet print unit 228*b*-228*h* are disposed such inkjet printhead(s) may deposit magenta, yellow, black, orange, violet, green, and a spot color ink, respectively.

Similar to the arrangement of the inkjet printheads of the inkjet print units 184, 186, and 188, the inkjet printheads that comprise each inkjet print unit 228*a*-228*h* may be disposed abutting one another end-to-end in linear fashion or in a two dimensional array such that the ejection nozzles of the inkjet printheads of each inkjet print group 228 span the width of the web 24.

Each inkjet print unit 184, 186, 188, and 228*a*-228*h* is associated with a print unit controller 190, 192, 194, and 196*a*-196*h*, respectively. Each print unit controller 190, 192, and 194 receives, from the print management control system 130, layer data 150*a*, 150*b* and 150*d* to be printed by the print unit 184, 186, and 188, respectively, associated therewith and position information of where such layer data 150*a*, 150*b*, and 150*d* should be printed. Each print unit controller 190, 192, and 194 controls the inkjet print units 184, 186, and 188, respectively, to cause the nozzles of such print unit to eject ink (or other material) onto the web 24 in accordance with such layer data 150*a*, 150*b*, and 150*d* and position data.

Further, the print management control system 130 provides layer data 150*c*, representing all of the color bitmaps to be printed using process color inks to the print unit controllers 196*a*-196*h* and position information of where on the web 24 to print such layer data 150*c*. In some embodiments, the layer data 150*c* is provided in its entirety to all of the print unit controllers 196*a*-196*h*. In response, the print unit controller 196 selects the color bitmap from the layer data 150*c* that is associated with the color of ink to be printed by the inkjet print unit 228, and generates signals to cause the inkjet printheads of such print unit 228 to deposit drops of such color of ink in accordance with the selected bitmap and position data. In other embodiments, the print management control system 130 provides the bitmap from the layer data 150*c* that is associated with the color of ink that is printed by the inkjet print unit 228 to the print unit controller 196 associated with such inkjet print unit.

In some embodiments, to support printing at high speeds, the positions of all of the inkjet print units (and the inkjet printheads) that comprises the imager units 44, 60, 70, and 82 are fixed (i.e., stationary) during printing as the web 24 is transported thereby.

As discussed above, the imager units 44, 60, 70, 82, and thus the inkjet print units 184, 186, and 188, respectively, thereof, may be operated to deposit drops of ink or other material having different volumes and at different resolutions.

In one embodiment, the imager unit 44 deposits a white (or other) colorant onto the clear web 24 to create a backing (or silhouette) onto which subsequent colorants may be deposited. Because the white colorant includes particles such as titanium dioxide, a relatively large drop volume (e.g., between about 5 pico-liters and 12 pico-liters/drop) is required to accommodate such particles. Further, because the silhouette comprises an image that has a substantially identical intensity level throughout, the silhouette may be formed at a relatively low resolution, for example, 600 dots-per-inch. Such large drop size and low resolution may also allow the drops of the material to coalesce and form a consistent layer of colorant to form the silhouette.

As discussed above, the imager unit 60 deposits a metallic ink on top of the colorant deposited by the imager unit 44. Like the colorant deposited by the imager unit 44, the metallic ink typically includes colorants and other materials having a relatively large particle size and the metallic ink is deposited to form a printed image that has little variability in intensity. Thus, the image using the metallic ink may be formed using drops of relatively large volume (e.g., from about 5 pico-liters/drop to 12-pico-liters/drop) and at a relatively low resolution (e.g., about 600 dots-per-inch).

The imager unit 70 forms a high-resolution color image on the web. Therefore, the imager unit 70 forms an image using each print unit 228 with drops of ink having a relatively low volume (e.g., between about 3 pico-liters/drop and about 6 pico-liters/drop) and at a high resolution (e.g., 1200 or more dots-per-inch). Such low drop volume and high resolution form an image that has intensity variability throughout to reproduce the page 150 with fine detail therein.

In some embodiments, the layer data 150*a*-150*d* generated by the ripping and color correction process (block 154) is screened bitmap data and the inkjet print units 184, 186, 228, and 188 are controlled by the print unit controllers 190, 192, 196, and 194, respectively, to place drops of material on the web 24 in accordance with such screened bitmap data. In other embodiments, the bitmap data generated by the ripping and color correction process (block 154) is not screened and the print unit controllers 190, 192, 196, and 194 screen the bitmap data provided by the ripping and color correction process (block 154) and drive the print units 190, 192, 196, and 194 to deposit drops of material on the web 24 in accordance with the screened data developed by the print unit controllers 190, 192, 196, and 194.

In some embodiments, the data used to drive the low-resolution inkjet print units 184 and 186 is screened in accordance with a conventional halftone (e.g., amplitude modulated) screening pattern. Further, the data used to drive the high-resolution inkjet print units 228 and 188 is screened in accordance with a frequency modulated screening pattern. It would be appreciated by one who has ordinary skill in the art that using the frequency modulated screening pattern allows reproduction of greater detail printed using such pattern. Other screening methods apparent to one who has ordinary skill in the art may be also be used.

In some embodiments, the print unit controllers 190, 192, 196, and 194 operated on one or more computer processors separate from computer processors used to implement the print management control system 130. In other embodiments, one or more of the print unit controllers 190, 192, 196, and 194 may operate as processes on the computer processors used to implement the print management control system 130.

As noted above, in some embodiments, the imager unit 82 is used to deposit a coating material onto the image printed by the imager unit 70. To ensure that a thin layer of coating is deposited, such imager unit also prints at high resolution using a relatively small drop volume.

It should be apparent to one who has ordinary skill in the art that using inkjet printheads that print at a relatively low resolution using large drop sizes when possible may be more cost effective than using inkjet printheads that print at high resolution with small drop sizes. Further, one having ordinary skill in the art would appreciate that the amount of data that has to be transmitted between the print unit controllers 190 and 192 and the inkjet print unit 184 and 186, respectively, that print at low resolution/large drop size may be substantially less than the amount of data that has to be transmitted from the inkjet print controller 228 and the inkjet print unit 196 that prints at high-resolution/small drop size, and thus the costs of implementing the print unit controllers 190 and 192 may be less than the cost of implementing the inkjet print controller 228.

Referring once again to FIG. 3, a camera 162 may be disposed following the image unit 82 that, when used, images the entire width of the web 24 (54 inches in the illustrated embodiment) and allows the print management control system 130 (or any of the other control systems of the system 20) undertake color-to-color registration and color calibration, detect and correct for missing pixel(s) and stitching errors (gaps or alignment errors between portions of an image printed by adjacent heads), and undertake printhead normalization across the web.

In some embodiments, the print management control system 130 undertakes a distortion correction process (block 200) prior to undertaking the ripping and color correction process (block 154). As described in greater detail below, the distortion correction process (block 200) adjusts the dimensions of the page 150 (or elements thereof) to compensate for shrinking of the portion of the web 24 on which such page 150 is printed when the portion of the web 24 is used in a shrink wrap application.

Figure 4B:
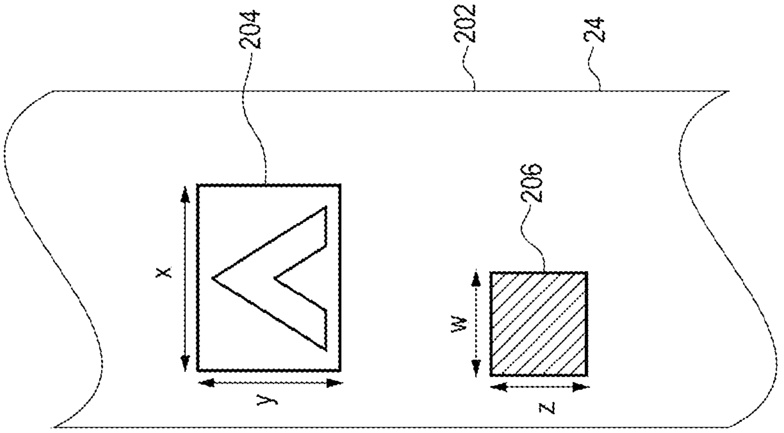
FIGS. 4A and 4B illustrates the effects of shrinking a web on images printed thereon.
Figure 4A:
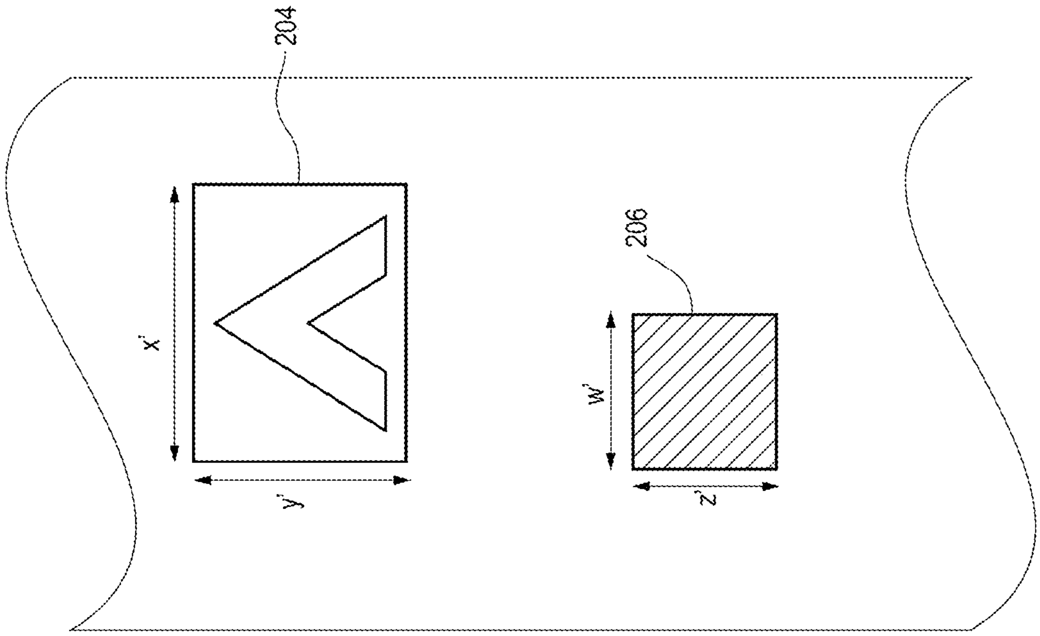

FIGS. 4A and 4B illustrates the dimensional compensation performed by the distortion correction process (block 200) undertaken of the print management control system 130. In the example shown in FIG. 4B, assume that after printing, the web 24 is to be used to produce a shrink-wrapped package 202 (i.e., after the web 24 is shrunk) having a first image 204 having dimensions (x, y) and a second image 206 having dimensions (w, z) printed thereon. The print management control system 130 undertakes distortion correction (block 200) and determines that to compensate for the shrinking of the film, the first image 204 should be printed having dimensions (x', y') and the second image should be printed having dimensions (w', z').

The distortion correction process (block 200) also determines dot gain changes that may result in each of the images 204 and 206 as a result shrinking the portions of the web 24, where such images are printed for example, because the distance between the dried drops of ink on the web decreases when such portions are shrunk. Thereafter, the distortion correction process (block 200) adjusts the image data to be printed to compensate for such dot gain changes prior to providing such image data to the ripping and color correction process (block 154).

Figure 5:
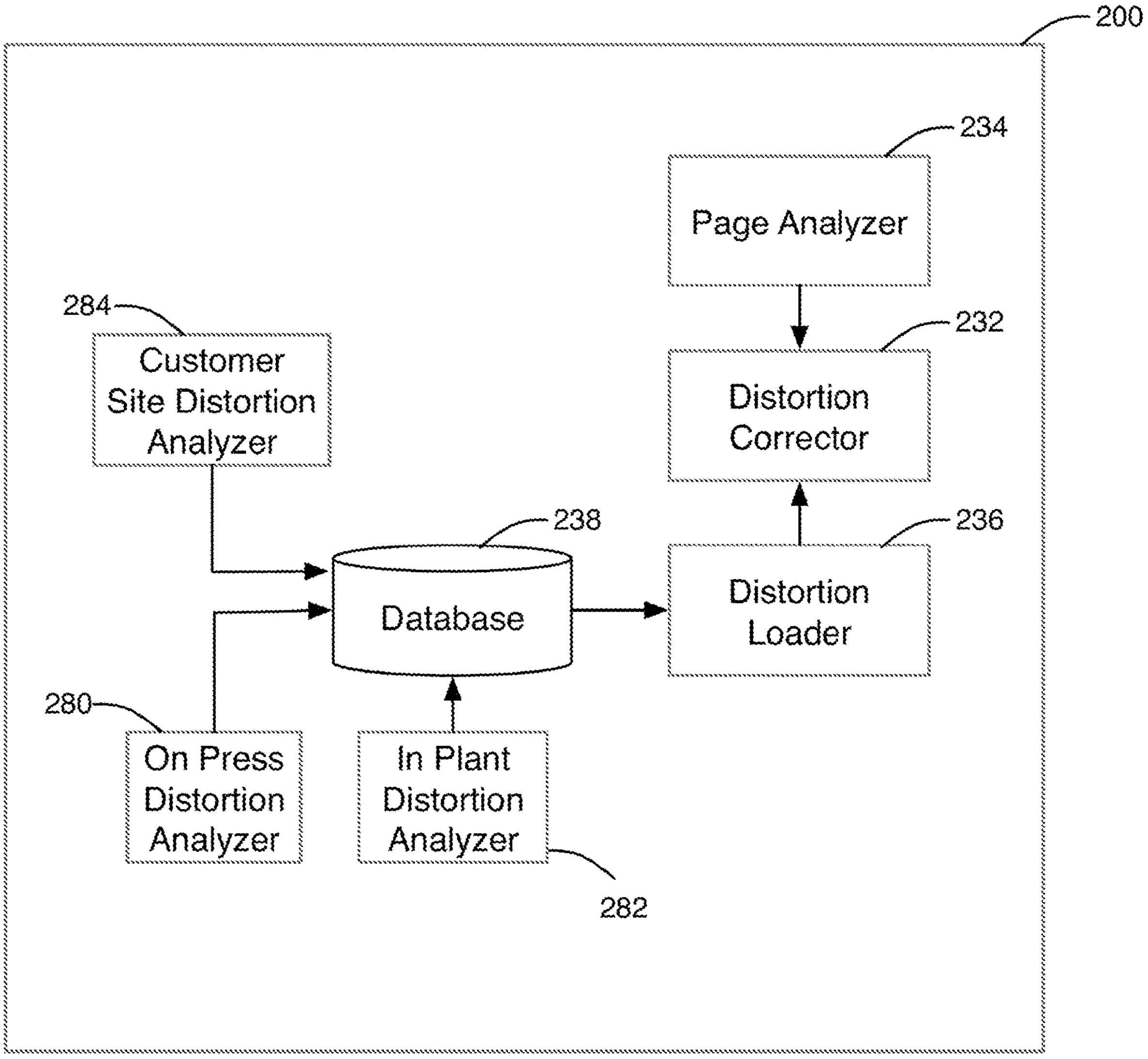
FIG. 5 is a block diagram of a distortion correction process of the print management system of FIG. 3.
Figure 6:
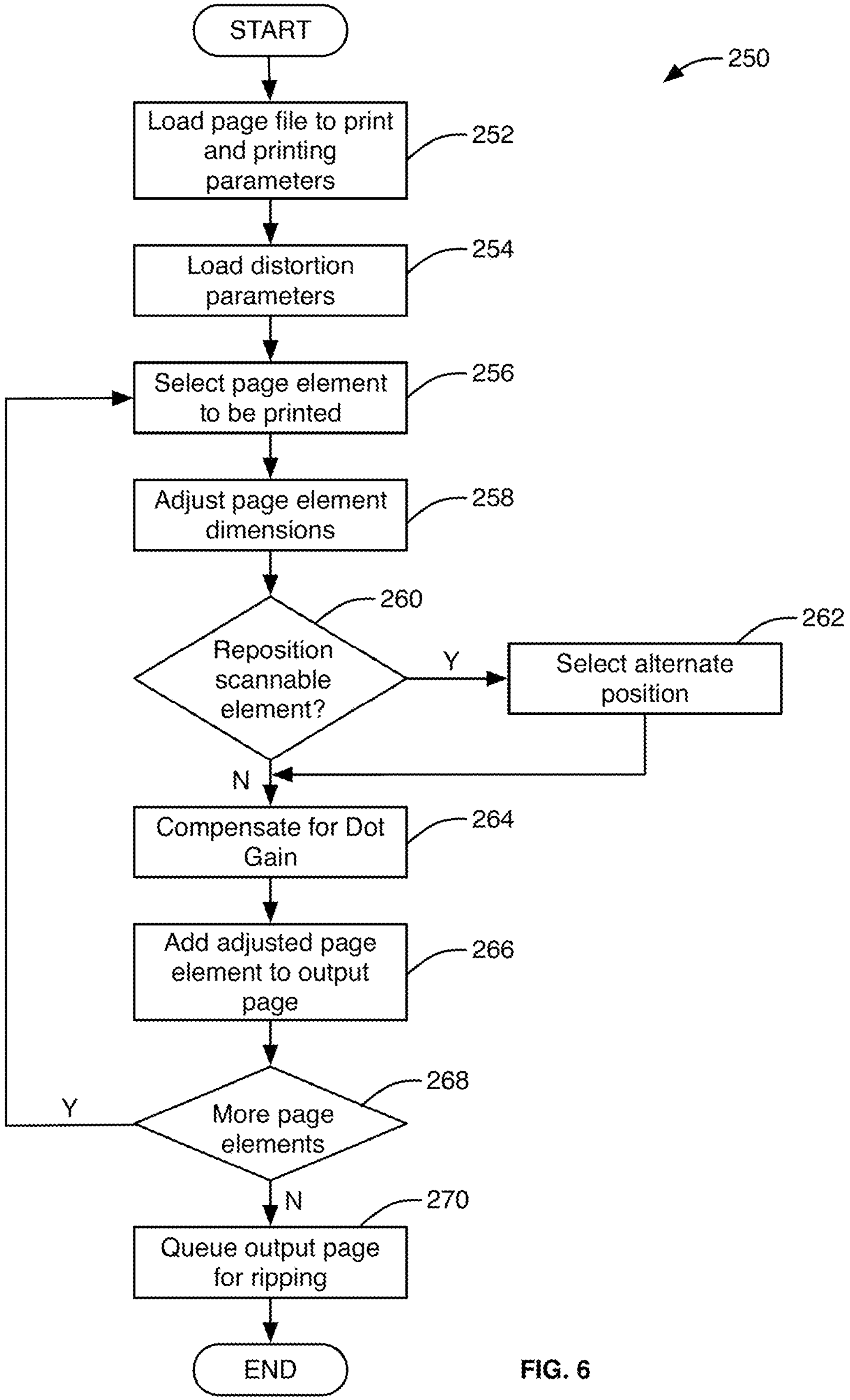
FIG. 6 is a flowchart of steps undertaken by the distortion corrector process of the distortion correction process of FIG. 5.

Referring also to FIG. 5, the distortion correction process (block 200) comprises a distortion corrector process (block 232), a page analyzer process (block 234), a distortion loader process (block 236), and a database 238. FIG. 6 shows a flowchart 250 of the steps undertaken by the distortion correction process (block 200). Referring to FIG. 3-6, at step 252, the distortion corrector process (block 232) loads a page file to print and printing parameters including the inks (or other materials) to be deposited by the imager units 44, 60, 70, and 82, the material of the web 24 to be printed on, a final product that the web 24 will be formed into (by shrinking), and the like.

At step 254, the distortion loader process (block 236) queries the database 238 for distortion information data in accordance with the job parameters. In particular, such distortion information data includes information regarding dimensional changes different portions of the material of the web 24 undergoes when shrunk. For example, a portion of the web 24 proximate an outer edge of the web may shrink more (or less) compared to a portion of the web 24 proximate a central portion of the web. In some embodiments, such dimensional change information includes changes that occur when the web is shrunk to positions of a grid of equally spaced horizontal and vertical lines on an unshrunk web 24. The equally spaced horizontal and vertical lines define a two-dimensional array of cells that comprise the grid. Each cell of the grid is associated with a portion of the web 24 on which an image may be printed and represents a predetermined area of contiguous pixels of such image. For example, each cell of the grid may represent a portion of an image that is 32 pixels wide by 32 pixels high. It should be apparent to one who has ordinary skill in the art that each cell may represent portions of the image having other dimensions. Each cell of the grid is associated with distortion information that includes how a portion of an image that is to be printed on the portion of the web 24 associated with the cell is to be modified to compensate for distortion that may occur to such printed portion of the image due to shrinkage of the web after printing.

The distortion information associated with each cell includes horizontal vertical scale factors by which the dimensions of the portion of the image to be printed on the portion of the web 24 associated with cell should be adjusted. In addition, the distortion information associated with each cell also includes information regarding adjustments that should be made to color values of pixels of the portion of the image associated with the cell to compensate for dot gain changes that may result from shrinking of the web 24 to dried drops of each type of ink (or other material) deposited on the web 24.

Further, the distortion information data may identify portions of the web 24 on which scannable elements (e.g., barcodes, QR codes, and the like) should not be printed because, for example, such portions may become too distorted or even occluded when the web 24 is shrunk around a product disposed therein. The distortion information may also identify alternate locations of the web 24 where such scannable elements should be repositioned if they happen to fall on a portion of the web 24 on which scannable elements should not be printed.

At step 256, the page analyzer process (block 234) selects from the page file loaded at step 252 a page element that is to be printed. Such page element may include an image, a scannable element, a text block, and the like. At step 258, the distortion corrector process (block 232) determines the position on the web 24 the selected page element is to be printed, uses the distortion information loaded at step 254 and such position to determine dimensional changes to apply to the selected page element, and adjusts the dimensions (e.g., by resampling an image, adjusting font metrics, and the like) of the selected page element to develop an adjusted page element. The distortion corrector process (block 232) may also, at step 258, adjust the start position where adjusted page element is to be printed on the unshrunk web 24 in accordance with the distortion data.

At step 260, the distortion corrector process (block 232) checks if the selected page element is a scannable element and the adjusted start position would place the printed scannable element on a portion of the web 24 where such scannable element should not be printed. If so, the distortion corrector process (block 232) proceeds to step 262, otherwise the distortion corrector proceeds to step 264.

At step 262, the distortion corrector process (block 232) adjusts the position of scannable element (as adjusted at step 258) to an alternate location (e.g., as identified in the distortion data loaded as step 254) and proceeds to step 264.

At step 264, the distortion corrector process (block 232) adjusts values of pixels of the adjusted page element to compensate for dot gain changes that may occur because of shrinking the web 24. Alternately, for example, if the page element is not an image, the distortion corrector process (block 232) adjusts color values specified by print commands in the page file associated with the page element, as would be apparent to one who has ordinary skill in the art.

At step 266, the distortion corrector process (block 232) adds the adjusted page element that results from dot gain compensation applied at step 260 to an output page file and printing commands to cause the page element to be printed at a position on the web 24 determined at steps 258 or 262.

At step 268, the page analyzer process (block 234) determines if there any additional page elements that have not been processed and, if so, returns to step 256 to select another page element. Otherwise, at step 270, the distortion loader process (block 232) adds the output page file to an input queue associated with the ripping and color correction process (block 154, FIG. 3) or otherwise provides the output page file to such process. Thereafter, the distortion correction block 200 exits.

Referring once again to FIGS. 3 and 5, the distortion correction process (block 200) includes an on-press distortion analyzer process (block 280), an in-plant distortion analyzer process (block 282), and a customer site distortion analyzer process (block 284) that develop and adjust the distortion information stored in the database 238.

Figure 7:
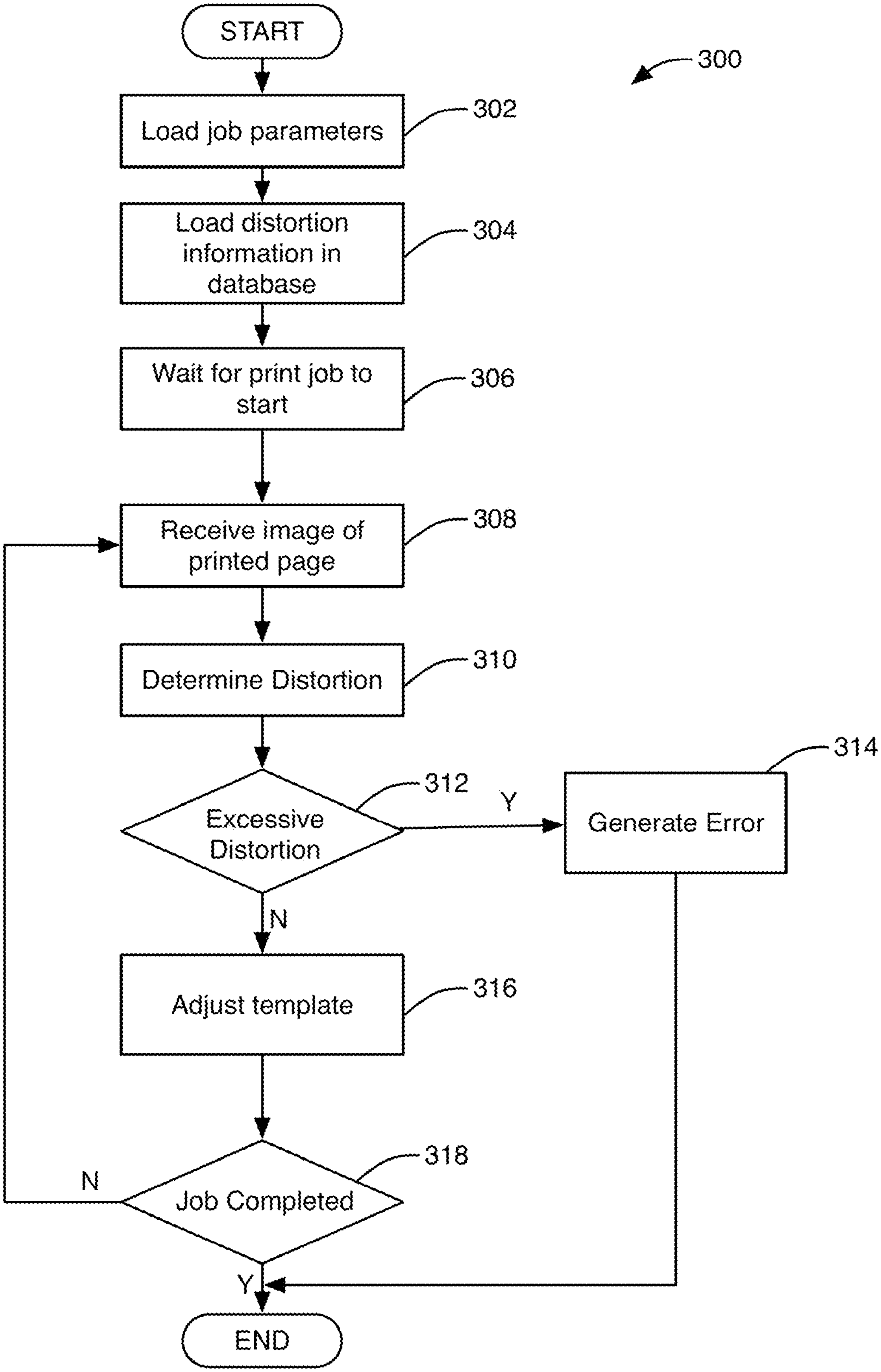
FIG. 7 is a flowchart of steps undertaken by an on-press distortion analyzer of the distortion correction process of FIG. 5.

FIG. 7 is a flowchart 300 of steps undertaken by the on-press distortion analyzer process (block 280) to monitor distortion during a production run.

Referring to FIG. 7, the on-press distortion analyzer process (block 280), at step 302, loads parameters of a production job including the page 150 to be printed on the web 24, the material that comprises the web 24, and the like.

At step 304 the on-press distortion analyzer process (block 280) selects from the database 238 the distortion information in accordance with the parameters of the production job.

At step 306, the on-press distortion analyzer process (block 280) waits for the production job to begin.

At step 308, the on-press distortion analyzer process (block 280) receives from a camera (not shown) disposed along a path of the web 24 between the dryer unit 84 and the take up roll 100 an image of a page printed on the web 24. In some embodiments, the on-press distortion analyzer on-press distortion analyzer process (block 280) determines when a page will be in the field of view of the camera and directs the camera to acquire the image. In other embodiments, the camera acquires images of all pages printed on the web at a predetermined rate in accordance with the web speed and page size being printed. Other ways of operating the camera to acquire the image of the printed page apparent to one who has ordinary skill in the art may be used.

At step 310, the on-press distortion analyzer on-press distortion analyzer process (block 280) analyzes the image of the printed page relative to the page data 150 (FIG. 3) used to generate the printed page to estimate distortion that has occurred during printing.

At step 312, the on-press distortion analyzer on-press distortion analyzer process (block 280) determines if the amount of distortion (either in dimensions of the printed page or in dot gain) determined at step 310 exceeds a predetermined acceptable level of distortion, and, if so, the on-press distortion analyzer on-press distortion analyzer process (block 280), at step 314, generates an error to the print management control system 130 to stop the production run because of excessive distortion and exits.

Otherwise, at step 316, the on-press distortion analyzer on-press distortion analyzer process (block 280) adjusts the distortion information in the database 238 associated with the parameters of the production run in accordance with the distortion determined at step 310.

At step 318, the on-press distortion analyzer on-press distortion analyzer process (block 280) determines if the production run has completed, and if so exits. Otherwise, the on-press distortion analyzer on-press distortion analyzer process (block 280) proceeds to step 308 to receive another image.

Figure 8:
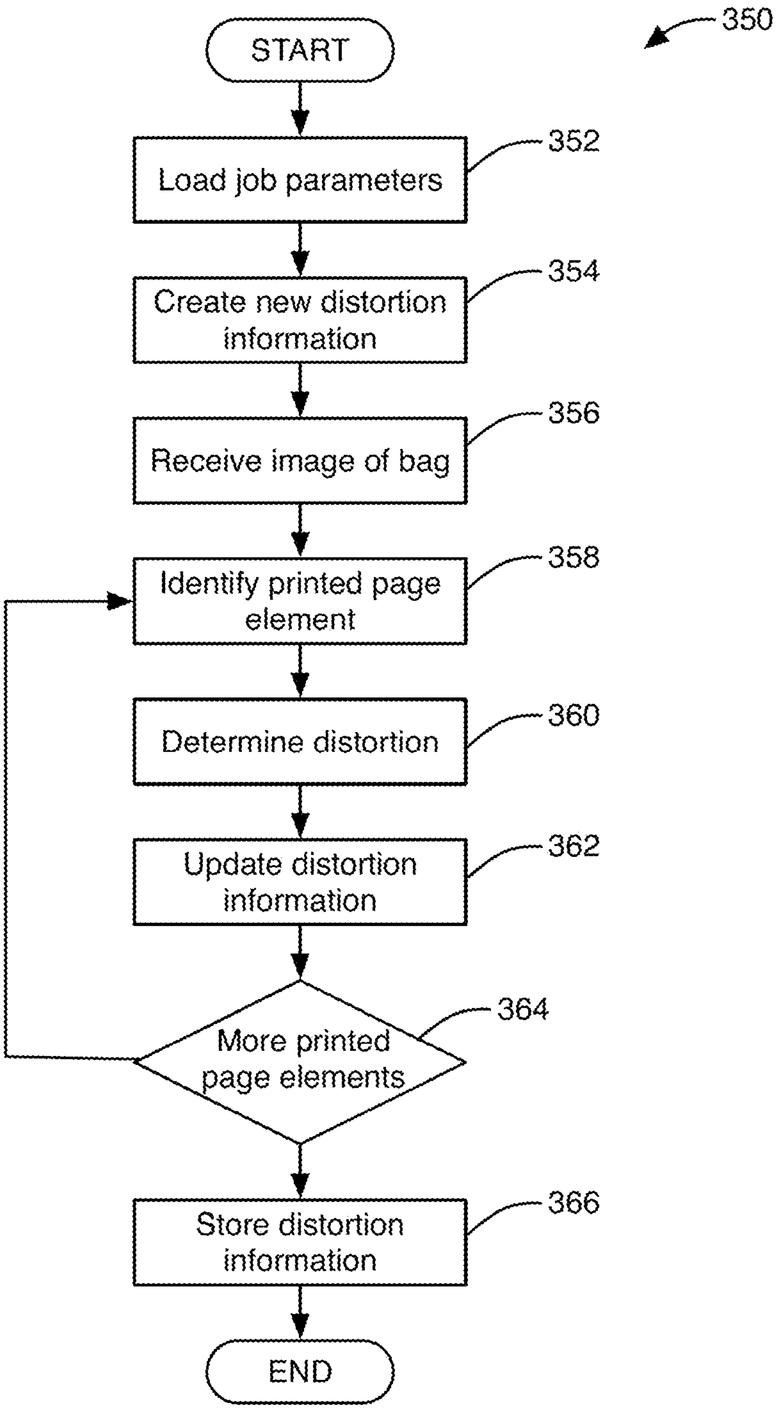
FIG. 8 is a flowchart of steps undertaken by an in-plant distortion analyzer of the distortion correction process of FIG. 5.

The in-plant distortion analyzer process (block 282) analyzes an image of a representative bag formed from a web 24 to develop distortion information used by the distortion corrector process (block 232) and the on-press distortion analyzer on-press distortion analyzer process (block 280). In some embodiments, a model of a product that is to be placed in bags formed from web 24 may be placed in the representative bag and the representative bag may be shrunk therearound. FIG. 8 illustrates a flowchart 350 of the steps undertaken by the in-plant distortion analyzer process (block 282).

At step 352, the in-plant distortion analyzer process (block 282) loads the job parameters used to print the web 24 that was used to form the bag.

At step 354, the in-plant distortion analyzer process (block 282) initializes new distortion information that is associated with the job parameters.

At step 356, the in-plant distortion analyzer process (block 282) receives an image of the representative bag after the bag has been formed and heat shrunk.

At step 358, the in-plant distortion analyzer process (block 282) identifies in the received image a printed page element printed on the bag and selects a page element in the page 150 that corresponds to the printed page element, by for example, comparing the contents and position of the printed page element to the specification of the page element in the page 150. In addition, the in-plant distortion analyzer process (block 282) undertakes image processing operations such as edge detection, thresholding, and the like to isolate in the received image the printed page element from other portions of the received image.

At step 360, the in-plant distortion analyzer process (block 282) determines the dimensional and position distortion between the printed page element identified at step 356 and the page element in the page 150 corresponding thereto.

At step 362, the in-plant distortion analyzer process (block 282) updates the distortion information created at step 354 with the dimensional and position distortion determined at step 356 and associates such distortion with the position on the unshrunk web 24 where the page element was printed (as specified in the page 150).

At step 364, the in-plant distortion analyzer process (block 282) determines if all of the printed page elements in the image received at step 356 have been analyzed, and, if so, proceeds to step 366. Otherwise, the in-plant distortion analyzer process (block 282) proceeds to step 358 to identify another printed element.

At step 366, the in-plant distortion analyzer process (block 282) stores the distortion information developed in steps 362-364 in the database 238, and then exits.

Referring once again to FIG. 5, the customer-site distortion analyzer process (block 284) is used to update distortion information stored in the database 238 in accordance with information received after a product has been place in the bag created from the web 24, and the bag is shrunk around the product.

Figure 9:
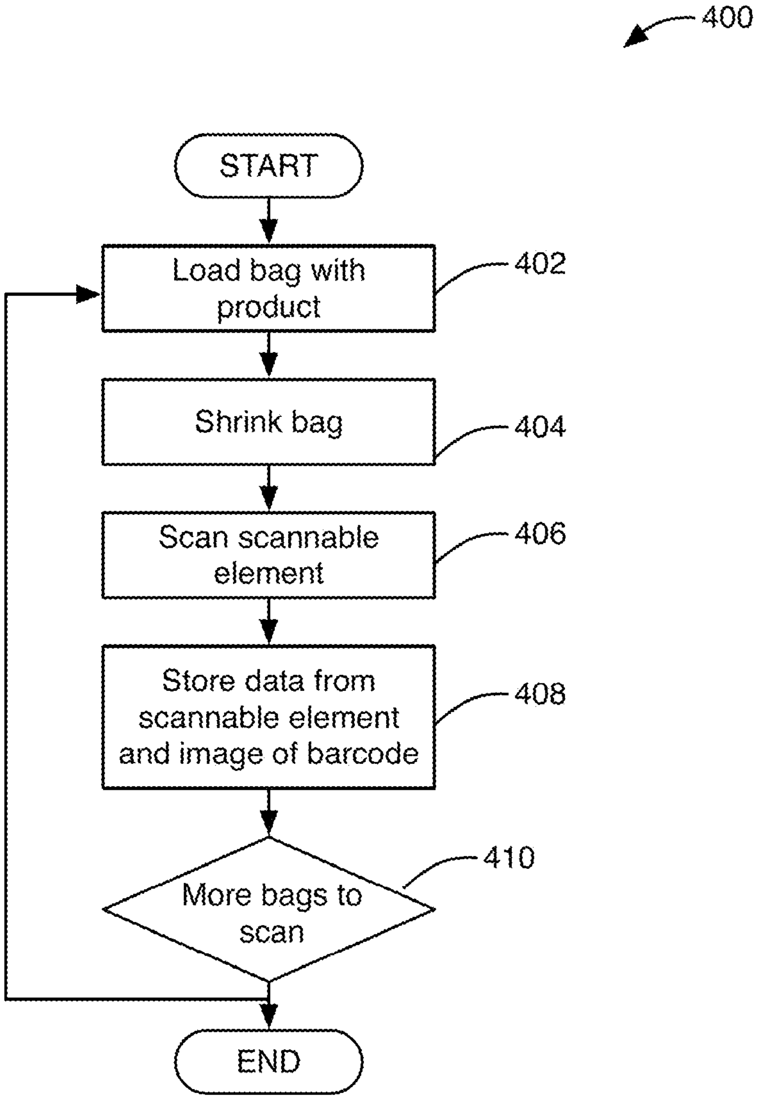
FIG. 9 is a flowchart of steps undertaken at a customer site to generate images of bags produced from the web printed on by the system of FIG. 1.

FIG. 9 shows a flowchart 400 of steps undertaken by a bag loading system to prepare data for use by the customer-site distortion analyzer process (block 284). At step 402, a product is placed in a bag produced from the printed web 24.

At step 404, the bag having the product therein in shrunk (e.g., in a heated water bath or other method apparent to one who has ordinary skill in the art).

At step 406, a scannable print element on the shrunk bag is scanned.

At step 408, data (e.g., a SKU or other identifying information) that results from scanning the scannable print element and an image of the scannable print element are stored on a computer (not shown). The computer may be at the production facility where the customer-site distortion analyzer process (block 284) operates, on a computer in the cloud, or at any other location accessible to the customer-site distortion analyzer process (block 284).

At step 410, a bag loading system determines if additional bags remain to be loaded with product and scanned, and if so, proceeds to step 402. Otherwise, the bag loading system exits.

Periodically, for example, after a predetermined number of production runs to produce bags in which a particular type of product is to be disposed, the customer-site distortion analyzer process (block 284) operates to determine if distortion errors are causing scanning errors at step 408 (FIG. 9).

Figure 10:
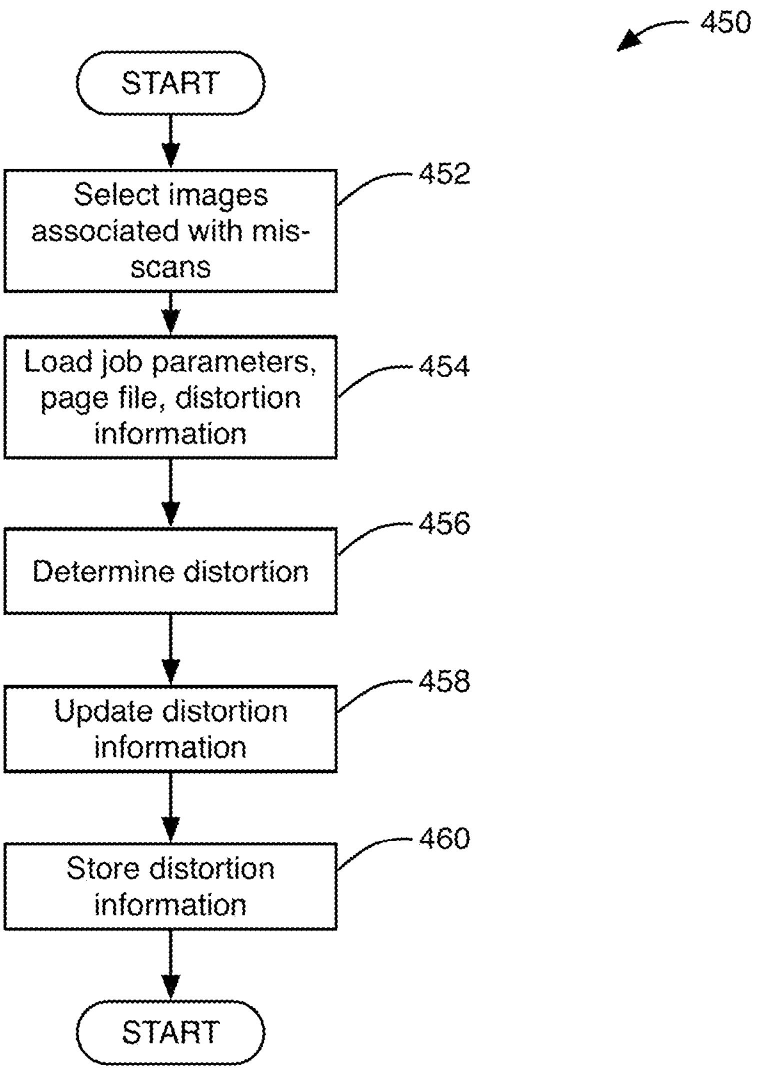
FIG. 10 is a flowchart of a customer site distortion analyzer of the distortion correction process of FIG. 5.

FIG. 10 is a flowchart 450 of steps undertaken by the customer-site distortion analyzer process (block 284) to update distortion information to reduce scanning errors. At step 452, the customer-site distortion analyzer process (block 284) selects images of scannable page elements that are associated with mis-scans. Such scannable page elements may have encoded therein information regarding when and where the web 24 from the bag imprinted was printed with the scannable page element, a sequence code, and the other production information.

At step 454, the customer-site distortion analyzer process (block 284) loads the job parameters, the page 150, and the distortion information associated with the job during which the printed scannable item that resulted in the mis-scan was printed on the web 24.

At step 456, the customer-site distortion analyzer process (block 284) analyzes each image selected at step 452 with respect to the scannable page element in the page 150 to determine the distortion present in the selected image.

At step 458, the customer-site distortion analyzer process (block 284) updates the distortion information loaded at step 454 and associated with the job parameters in accordance with the distortion determined at step 456. At step 460, the customer-site distortion analyzer process (block 284) stores the updated distortion in the database 238 for use with subsequent jobs having job parameters identical to those loaded at step 454.

Thereafter, the customer-site distortion analyzer process (block 284) exits.

Figure 11A:
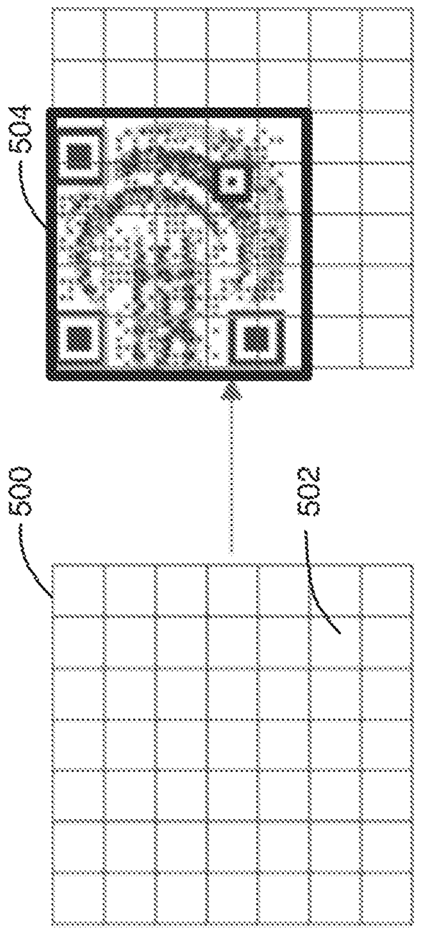
FIGS. 11A and 11B graphically illustrate determining the distortion to an image printed on a web by the system of FIG. 1.
Figure 11B:
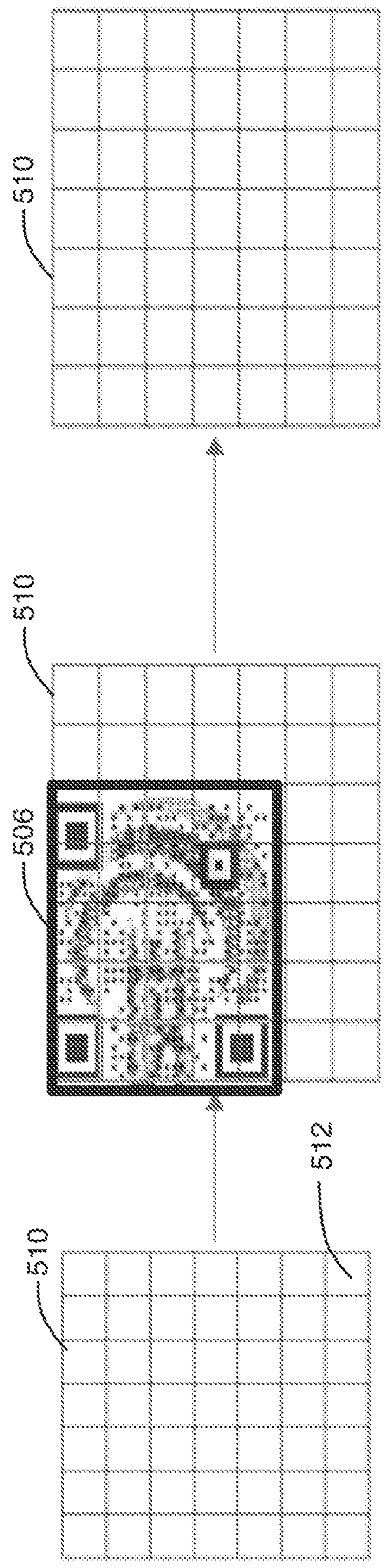

FIGS. 11A and 11B graphically illustrates an example of how dimensional distortion information may be developed at step 310 (FIG. 7), step 360 (FIG. 8), and step 456 (FIG. 9).

Referring to FIG. 11A, a first two-dimensional array 500 of cells 502 is created wherein each cell spans a predetermined number of pixels of an element to be printed. For clarity, the reference number 502 associated with each cell of grid is shown in FIG. 11A with only a few such cells.

Preferably, each cell 502 of the first two-dimensional array 500 spans an equal number of pixels horizontally and vertically. An image element 504 in the page 150 to be printed is associated with the two-dimensional array of cells 502 to determine the number of cells 502 spanned by the image element 504. In the example shown in FIG. 11A, the image 504 spans an area of 5 cells horizontally and 5 cells vertically.

Referring to FIG. 11B, after the image element 504 is printed on the web 24, an image 506 of the printed page element is acquired after the web 24 has been shrunk and formed into a bag. The acquired image is aligned with a second two-dimensional array 510 of cells 512. Initially, the dimensions of each cell 512 is identical to the dimension of each cell 510.

Thereafter, the dimensions of the cells 512 are adjusted so that the acquired image 506 spans an identical number of cells 502 spanned by the image 504 (i.e., 5×5). The number of horizontal pixels spanned by the adjusted cell 512 divided by the number of horizontal pixels spanned by the cell 502 provides a horizontal scaling factor. Similarly, the number of vertical pixels spanned by the adjust cell 512 divided by the number of vertical pixels spanned by the cell 502 provides a vertical scaling factor. Such horizontal and vertical scaling factors are stored in the distortion information in the database 238.

As discussed above, each cell 502 is associated with a predetermined area of pixels of a portion of the image 504. The changes to such portion of the image associated with each cell may be analyzed as described above to determine the dimensions of each adjusted cell 512. Horizontal and vertical scale factors may be calculated from such determined dimensions to and stored as distortion information associated with each cell 502. Similarly, changes to image density (i.e., dot-gain) due to shrinking of the web 24 may be analyzed to determine the dot-gain adjustment needed to compensate for such changes and also stored as distortion information associated with each cell 502.

It should be apparent to those who have skill in the art that any combination of hardware and/or software may be used to implement the system print management control system 130 and print unit controllers 190, 192, 194, and 196 described herein. It will be understood and appreciated that one or more of the processes, sub-processes, and process steps described in connection with FIGS. 1, 3, and 5-11 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1, 3, and 5-11. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the print management control system 130 and the print unit controllers 190, 192, 194, and 196), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

INDUSTRIAL APPLICABILITY

In summary, a printing system 20 for printing on a clear polymeric film web 24 is disclosed in which a plurality of imager units 44, 60, 82, and 228 have inkjet print units 184, 186, 188, and 228. Such inkjet print units are operated to deposit material on the web 24 at a particular resolution and drop size selected in accordance with the type of material being deposited by such inkjet print unit and content being reproduced thereby. In addition, a distortion corrector 200 determines adjustments to the dimensions and position on the web 24 of a page element prior being printed to compensate for distortion of the printed page element that results from heat shrinking of a bag manufactured from the web 24 around a product disposed therein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure. This written description uses examples to disclose the invention, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for printing on clear polymeric film web, comprising:

- a first stationary inkjet print unit having first ejection nozzles that span a width of the clear polymeric film web;
- a second stationary inkjet print unit having second ejection nozzles that span the width of the clear polymeric film web;
- a web transport that conveys the clear polymeric film web past the first and second stationary inkjet print units;
- a distortion corrector that adjusts dimensions of a page element to be printed in accordance with predetermined distortion data to develop an adjusted page element, wherein the dimensions are adjusted to compensate for expected shrinking of the clear polymeric film web after printing, the distortion corrector being further adapted to determine dot gain changes as a result of the shrinking and to adjust image data of the adjusted page element to compensate for such dot gain changes;

a raster image processor that rasterizes printing commands associated with the adjusted page element to generate bitmap data;

a first print controller adapted to receive the bitmap data and in response operate the first stationary inkjet print unit to deposit drops of a first material on the clear polymeric film web in accordance with the bitmap data at a first resolution; and a second print controller that receives the bitmap data and in responses operates the second stationary inkjet print unit to deposit drops of a second material on the clear polymeric film web in accordance with the bitmap data at a second resolution, wherein the first and second resolutions are different.

2. The system of claim 1, wherein the first print controller operates the first stationary inkjet print unit to deposit drops of material having drop volume within a first range and the second print controller operates the second inkjet print unit to deposit drops of material having drop volume within a second range, wherein the first range and the second range are different.

3. The system of the claim 1, wherein in the first range is between about 5 pico-liters-per-drop and about 12 pico-liters-per-drop and the second range is between about 3 pico-liters-per-drop to about 6 pico-liters-per-drop.

4. The system of claim 1, wherein the first resolution is less than 1200 dots-per-inch and the second resolution is at least 1200 dots-per-inch.

5. The system of claim 4, wherein the first resolution is 600 dots-per-inch and the second resolution is 1200 dots-per-inch.

6. The system of claim 1, wherein the web transport conveys the clear polymeric film web at a speed of at least 300, 400, or 500 feet per minute.

7. The system of claim 1, wherein the distortion corrector includes an on-press distortion analyzer that monitors distortion of a plurality of pages printed on the clear polymeric film web as the clear polymeric film web is transported by the web transport.

8. The system of claim 1, wherein the distortion corrector includes an in-plant distortion analyzer that analyzes distortion of a bag formed from a portion of the clear polymeric film web to develop distortion information.

9. The system of claim 8, wherein the distortion corrector includes a customer-site distortion analyzer that analyzes an image of the bag having a product disposed therein to adjust the distortion information.

10. The system of claim 1, wherein the distortion corrector adjusts color values associated with the page element to compensate for dot gain changes that result from shrinking of web.

11. The system of claim 1, wherein the first material is a white colorant and the second material is a process color ink.

12. A method for printing on clear polymeric film web, comprising:

conveying the clear polymeric film web past first and second stationary inkjet print units;

adjusting dimensions of a page element to be printing in accordance with predetermined distortion data to develop an adjusted page element, wherein the dimensions are adjusted to compensate for expected shrinking of the clear polymeric film web after printing, and determining dot gain changes as a result of the shrinking and adjusting image data of the adjusted page element to compensate for such dot gain changes;

rasterizing printing commands associated with the adjusted page element to generate bitmap data;

operating the first stationary inkjet print unit to deposit drops of a first material on the clear polymeric film web in accordance with the bitmap data at a first resolution; and operating the second stationary inkjet print unit to deposit drops of a second material on the clear polymeric film web in accordance with the bitmap data at a second resolution;

wherein the first and second resolutions are different.

13. The method of claim 12, wherein the step of operating the first stationary inkjet print unit includes operating the first stationary inkjet print unit to deposit drops of material having drop volume within a first range and wherein the step of operating the second stationary inkjet print unit includes operating the second print controller the second inkjet print unit to deposit drops of material having drop volume within a second range, wherein the first range and the second range are different.

14. The method of the claim 13, wherein in the first range is between about 5 pico-liters-per-drop and about 12 pico-liters-per-drop and the second range is between about 3 pico-liters-per-drop to about 6 pico-liters-per-drop.

15. The method of claim 12, wherein the first resolution is less than 600 drops-per-inch and the second resolution is at least 1200 drops-per-inch.

16. The method of claim 12, wherein the web transport conveys the clear polymeric film web at a speed of at least 300, 400, or 500 feet per minute.

17. The method of claim 12, further including the step of analyzing distortion of a bag formed from a portion of the clear polymeric film web to develop distortion information.

18. The method of claim 12, wherein the step of operating the first inkjet print unit comprises causing the first inkjet print unit to deposit a white colorant on the clear polymeric film web and wherein the step of operating the second inkjet print unit comprises causing the second inkjet print unit to deposits a process color ink on the clear polymeric film web.

* * * * *